United States Patent [19]
Ogihara et al.

[11] Patent Number: 4,634,254
[45] Date of Patent: Jan. 6, 1987

[54] ELECTROMAGNETICALLY ACTUATED SHUTTER FOR A CAMERA

[75] Inventors: Masuo Ogihara; Hiroaki Ishida; Shinji Nagaoka; Koji Sato, all of Yotsukaido, Japan

[73] Assignee: Seiko Koki Kabushiki Kaisha, Tokyo, Japan

[21] Appl. No.: 747,015

[22] Filed: Jun. 20, 1985

[30] Foreign Application Priority Data

Jun. 25, 1984 [JP] Japan ................. 59-130674

[51] Int. Cl.⁴ .................. G03B 3/00; G03B 9/08; G03B 7/08
[52] U.S. Cl. ................. 354/403; 354/234.1; 354/439
[58] Field of Search ............... 354/400, 402–405, 354/412, 439, 456, 195.1, 234.1, 436, 437

[56] References Cited

U.S. PATENT DOCUMENTS 3,950,766  4/1976  Erlichman et al. ............... 354/437
4,401,378  8/1983  Hirohata et al. ............... 354/456 X Primary Examiner—William B. Perkey
Attorney, Agent, or Firm—Robert E. Burns; Emmanuel J. Lobato; Bruce L. Adams

[57] ABSTRACT

An electromagnetically actuated shutter for a camera wherein automatic focusing and exposing operation are controlled by means of a single reversible stepping motor.

18 Claims, 6 Drawing Figures

ELECTROMAGNETICALLY ACTUATED SHUTTER FOR A CAMERA

BACKGROUND OF THE INVENTION

This invention relates to an electromagnetically actuated shutter for a camera of the automatic focusing and automatic exposing type.

In a camera of the automatic focusing and automatic exposing type wherein automatic focusing and automatic exposing operations are carried out one after the other in response to operation of a release member, a scanning action of a distance measuring mechanism and an opening and closing action of a sector are normally derived from a tensile force of a spring released by operation of the release member as disclosed, for example, in Japanese laid-open Pat. No. 54-99624.

Accordingly, in this type of camera, a release itself is acted upon directly and indirectly by a spring force, which hinders smooth operation of the release member. Besides, the camera of this type has drawbacks that because the stroke must be large in order that the automatic focusing and exposing operations may be carried out one after the other, the camera is apt to shake and a speed uniforming mechanism such as a governor is required, which makes the mechanisms complicated.

SUMMARY OF THE INVENTION

The present invention provides an electromagnetically actuated shutter wherein automatic focusing and exposing operations are carried out by means of a single stepping motor, thereby significantly simplifying the construction and improving the operability of the shutter.

An electromagnetically actuated shutter of the present invention is characterized in that a member which is moved between a focusing region and an exposing operation region is actuated by means of a single stepping motor, and the direction of rotation of the stepping motor is reversed to restore the movable member after the lapse of a time corresponding to object brightness information by controlling means which operates as the movable member is moved into the exposing operation region.

DETAILED DESCRIPTION OF PREFERRED EMBODIMENTS

Figure 1:
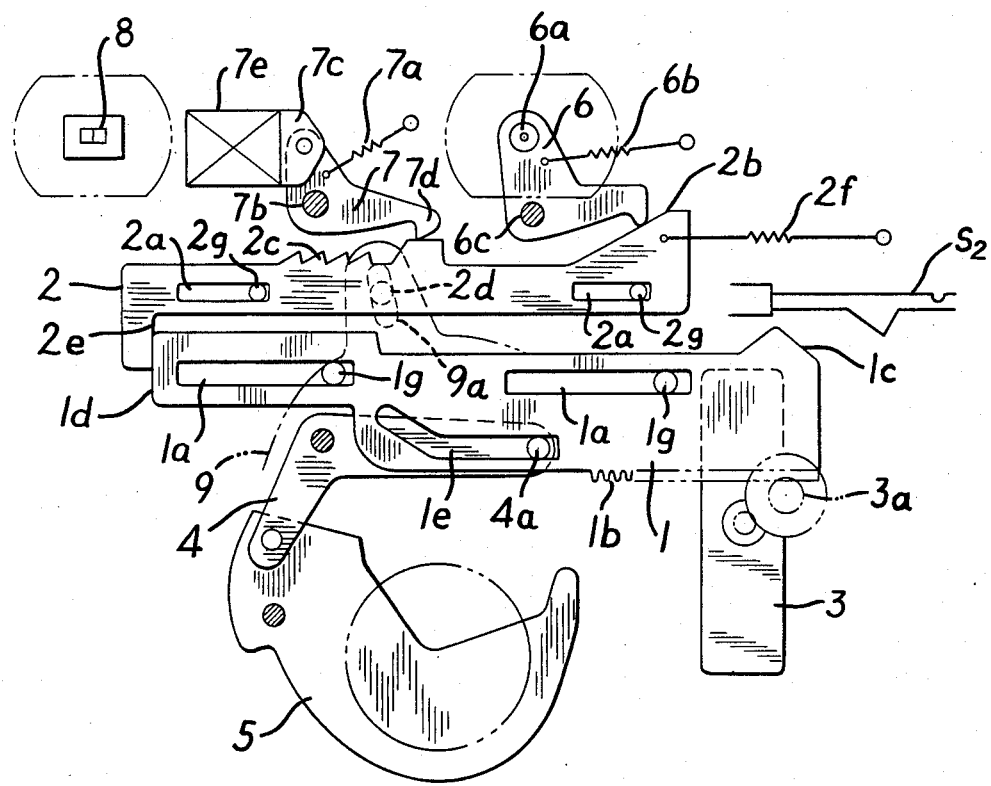
FIG. 1 is a diagrammatic representation illustrating a construction of a shutter of an embodiment of the present invention.

The present invention will be described in detail below in connection with embodiments illustrated in the drawings.

Referring to FIG. 1 which is a diagrammatic representation illustrating a construction of an electromagnetically actuated shutter of an embodiment of the present invention before a releasing operation, reference numeral 1 designates an actuating plate member mounted for forward and return movement on a fixed base plate by means of a pair of pins 1g which are mounted on the fixed base plate and extend through a pair of elongated slots 1a formed in the actuating plate 1. The actuating plate 1 has provided thereon a rack portion 1b which is meshed with a pinion 3a for receiving a driving force of electromagnetic driving means comprised of a stepping motor 3, a projection 1c for closing a focusing - exposing changing over switch S2, and an abutting portion 1d for abutting with an interlocking plate 2 which will be hereinafter described. The actuating plate 1 further has formed therein a cam slot 1e for moving a set of shutter sector blades 5 (only one of which is illustrated in the drawings) into an inoperative position when in a focusing mode and for pivoting the sector 5 in response to a distance of movement of the actuating plate 1 when in an exposing mode. The cam slot 1e includes a horizontal portion extending in the direction of movement of the actuating plate 1 and an inclined portion contiguous to the horizontal portion, and a pin 4a mounted on an end of an arm of a sector lever 4 extends through the cam slot 1e of the actuating plate 1.

Reference numeral 2 designates an interlocking plate member mounted for movement on the fixed base plate by means of a pair of pins 2g mounted on the fixed base plate and extending through a pair of elongated slots 2a formed in the interlocking plate 2. The interlocking plate 2 has provided thereon a light emitting element scanning cam 2b, an abutting toothed portion 2c adapted to be abutted by a focusing controlling abutting lever 7, a pin 2d adapted to be engaged with a hole 9a of a distance ring 9, and a projection 2e adapted to be abutted with the actuating plate 1. The interlocking plate 2 is urged rightwardly in FIG. 1 by means of a spring 2f.

Reference numeral 6 denotes a light emitting element scanning lever mounted for pivotal motion on a pin 6c on the fixed base plate and urged in a clockwise direction by a spring 6b. The lever 6 is in the form of a crank, and an end of an arm thereof forms a sliding engaging portion which engages with the cam 2b on the interlocking plate 2 while a light emitting element 6a for emitting light in the form of pulses is provided on an end of the other arm of the lever 6.

Reference numeral 7 denotes a focusing controlling engaging lever mounted for pivotal motion on a pin 7b on the fixed base plate and urged in a clockwise direction by a spring 7a. An iron member 7c is mounted at an end of the lever 7. When an electromagnet 7e is deenergized in response to a coincidence signal from a two divided sensor 8 which receives reflected light from an object to be photographed, the lever 7 is pivoted in the clockwise direction until a claw 7d provided on the other end thereof is engaged with the abutting toothed portion 2c on the interlocking plate 2 to thus stop movement of the interlocking plate 2.

Operations of the shutter having such a construction as described above will now be described.

If a releasing member (not shown) is depressed in the condition before a releasing operation as shown in FIG. 1, directly thereafter a main switch S1 is opened to energize the stepping motor 3 to move the actuating plate 1 and the interlocking plate 2 in integral relationship in the forward or rightward direction in FIG. 1. Simultaneously, the electromagnet 7e is energized in attract the iron member 7c thereto to hold the focusing controlling lever 7 to a position clear of the abutting toothed portion 2c of the interlocking plate 2. Thus, the light emitting element 6a at the end of the arm of the scanning lever 6 which begins to pivot in the clockwise direction under the guidance of the cam 2b irradiates light in the form of pulses to an object being photographed.

Meanwhile, the two divided sensor 8 receives the light in the form of pulses which is emitted from the light emitting element 6a and reflected from the object, and when the outputs of the two sections of the two divided sensor 8 coincide with each other, a focusing signal is provided. In response to the focusing signal, a result of measurement is indicated in a finder (not shown), and the electromagnet 7e is deenergized. The focusing controlling lever 7 thus released from the attraction by the electromagnet 7e is now pivoted in the clockwise direction by the urging of the spring 7a to engage the claw 7d thereof with the engaging toothed portion 2c of the interlocking plate 2 to stop or rest the movement of the forward interlocking plate 2. Accordingly, the distance ring 9 which is connected to be integrally pivoted by the interlocking plate 2 via the pin 2d is also stopped to stop a taking lens (not shown) at a focused position.

On the other hand, the actuating plate 1 still continues its forward or rightward movement even after the focusing operation, and during the further rightward movement, the focusing - exposing mode changing over switch S2 is closed by the projection 1c of the actuating plate 1 to deenergize the light emitting element 6a while at the same time the electromagnet 7a is deenergized in the event it remains energized due to the failure of the sensor 8 to produce a focusing signal.

Figure 3:
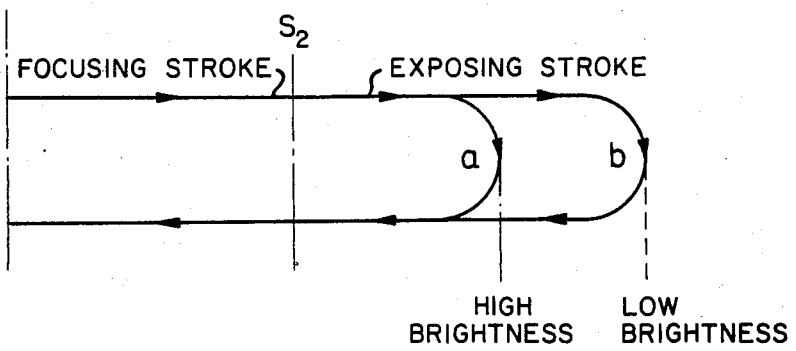
FIG. 3 is a diagram illustrating a locus of movement of an actuating member of the shutter of FIG. 1 or 2.

Simultaneously with such changing over to the exposing mode, a number of pulses calculated in response to the object brightness detected in advance are further outputted continuously from the controlling circuit. As a result, the stepping motor 3 continues its forward rotary motion to move the actuating plate 1 in the rightward direction. During this continued forward or rightward movement of the actuating plate 1, the sector lever 4 having the pin 4a thereon engaged with the cam slot 1e in the actuating plate 1 now rides from the horizontal portion into the inclined portion of the cam slot 1e and is pivoted in the counterclockwise direction in FIG. 1 to thus effect an opening operation of the sector 5 with the other end of the sector lever 4. If a number of pulses which varies in response to the magnitude of brightness of an object are outputted and then the controlling circuit reverses the phase of the pulses, then after the stepping motor 3 opens the sector 5 to an opening corresponding to the object brightness, the stepping motor 3 begins its reverse rotation (a and b of FIG. 3) to move the actuating plate 1 in the return or leftward direction to pivot the sector lever 4 in the reverse direction to close the sector 5. The actuating plate 1 is further moved in the return or leftward direction until it returns to its initial position.

Figure 2:
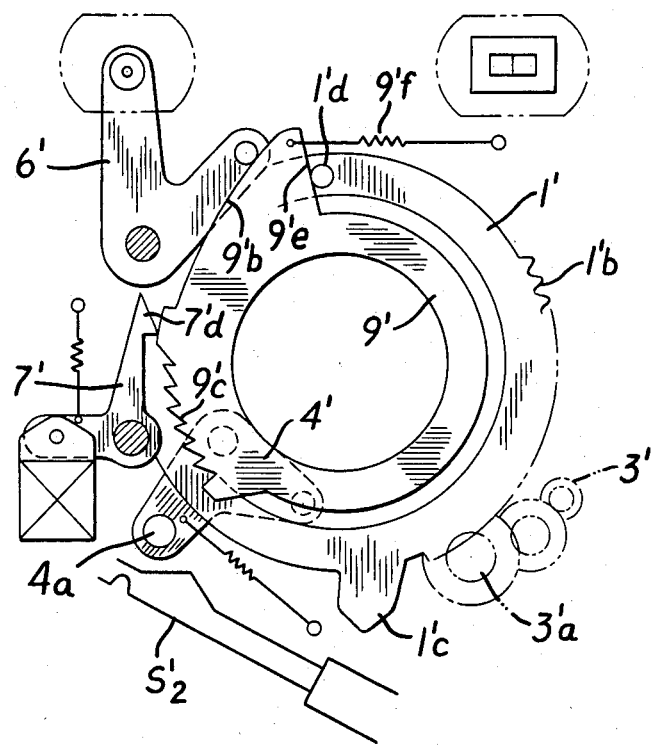
FIG. 2 is a diagrammatic representation illustrating a construction of a shutter of another embodiment of the invention.

Another embodiment of the invention is illustrated in FIG. 2, and in this embodiment, an actuating plate and a distance ring are each formed as a ring-formed member mounted for pivotal motion around an optical axis of a taking lens (not shown). An actuating plate member which is designated at 1' in FIG. 2 has formed on an outer peripheral edge thereof a rack 1'b which is meshed with a pinion 3'a, and a projection 1'c for closing a focusing - exposing mode changing over switch S'2 and for operating a sector lever 4'. The sector lever 4' has a pin 4'a implanted thereon for abutting with the projection 1'c of the actuating plate 1'. A distance ring 9' is located inside the actuating plate 1' and is urged in a clockwise direction by a spring 9'f. The distance ring 9' has a projection 9'b provided thereon, and one side of the projection 9'b is formed as an abutting face 9'e for abutting with a pin 1'd on the actuating plate 1' while the other side of the projection 9'b is formed as a cam face for pivoting a travelling lever 6'. The distance ring 9' further has an engaging toothed portion 9'c provided thereon for engaging with a claw 7'd of a focusing controlling lever 7'.

The distance ring 9' comprises an interlocking member which undergoes forward and return movements together with the actuating plate 1' in the focusing region. After the forward movement of the distance ring 9' is arrested by engagement of the claw 72, the actuating plate 1' continues its forward movement relative to the stationary distance ring 9'.

Operations of the arrangement are not basically different from those of the formerly described arrangement, and hence description of the same will be omitted herein. In this embodiment, however, a shutter mechanism can be constructed very compactly since the actuating plate 1' and the distance ring 9' are each formed as a ring.

Figure 4:
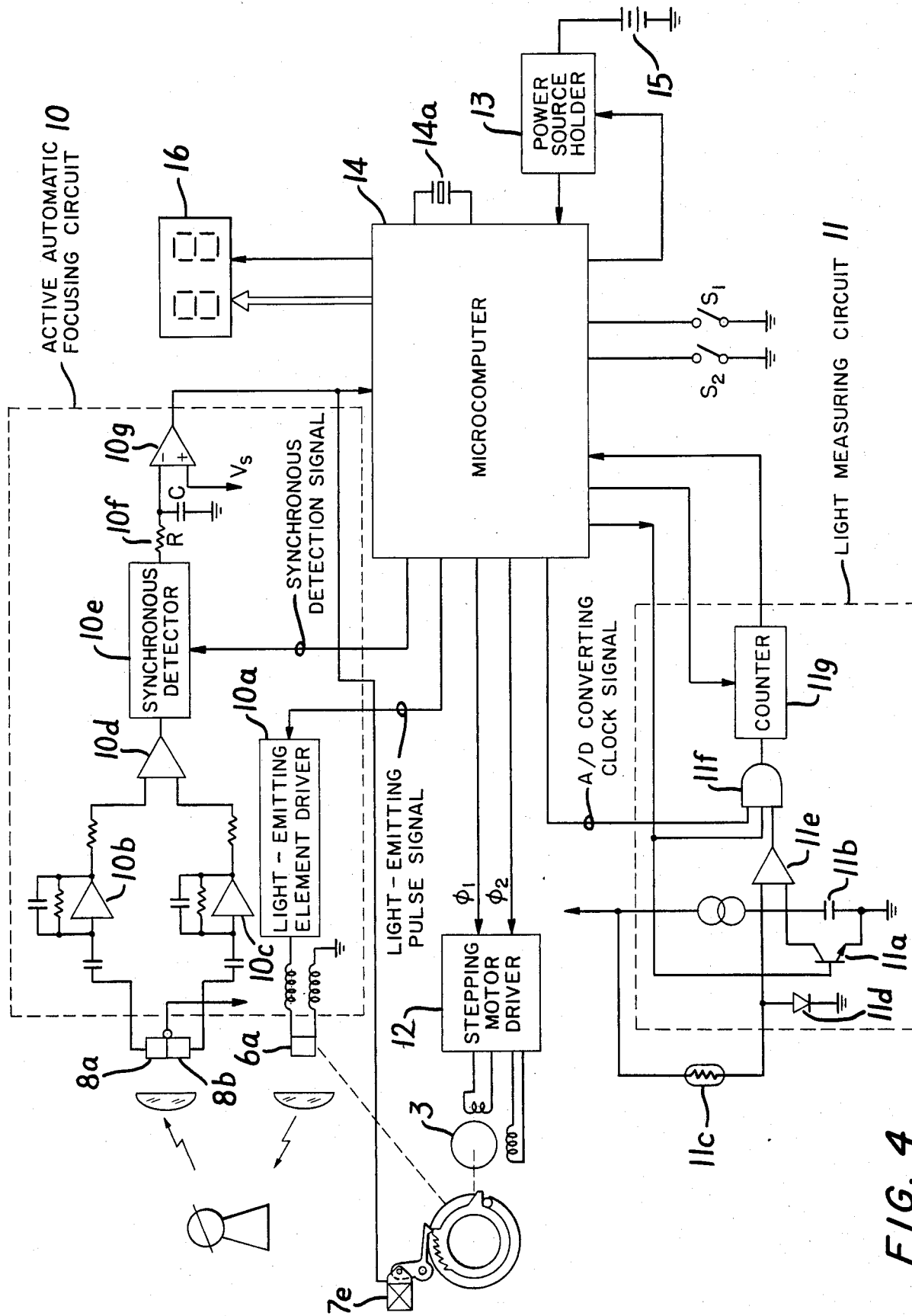
FIG. 4 is a block diagram illustrating an embodiment of a controlling circuit.

FIG. 4 illustrates an embodiment of an electric circuit for controlling such a shutter mechanism as described above. Referring to FIG. 4, the electric circuit includes an active auto focusing circuit 10, a light measuring circuit 11, a stepping motor driving circuit 12, a power source holding circuit 13 and a microcomputer 14 which forms a controlling section. The active auto focusing circuit 10 includes a light emitting circuit portion and a light receiving circuit portion. The light emitting circuit portion is constructed such that it receives light emitting pulses from the microcomputer 14 which will be hereinafter described and outputs pulse signals of a predetermined fixed frequency to a light emitting element 6a such as an infrared-ray emitting diode by means of a light emitting element driving circuit 10a in order than an infrared-ray beam which flickers in a predetermined fixed cycle may be radiated to an object. Meanwhile, the light receiving circuit portion is constructed such that infrared-ray beam reflected from an object is converted into an electric signal by the two divided sensor 8 including two photodiodes 8a and 8b, and after output signals from the photodiodes 8a and 8b are amplified to a predetermined level by a pair of preamplifiers 10b and 10c, a difference between the signals is detected by a differential amplifier 10d and is applied to a synchronous detector 10e for detecting in synchronism with a flickering cycle of the light emitting element 6a whereafter the signal is integrated by an R-C integrator circuit 10f and is compared with a reference signal Vs at a comparator 10g so as to provide a coincidence signal when the signal coincides with the reference signal Vs. The coincidence signal is applied as the aforesaid focusing signal to electromagnet 7e.

The light measuring circuit 11 is constructed such that a terminal voltage of a capacitor 11b which is charged with a constant electric current via a transistor 11a which is turned on and off in response to operation of the focusing - exposing mode changing over switch S2 and another terminal voltage of a logarithmic compressing diode 11d which is connected in series to a light receiving element 11c such as a CdS element or the like are compared with each other by a comparator 11e so that when the focusing - exposing mode changing over switch S2 operates, a gate 11f is opened, and when the comparator 11e is reversed, the gate 11f is closed, to thus allow and prevent passage of clock signals whereby the clock signals are counted by a counter 11g to output a digital signal corresponding to object brightness.

The stepping motor driving circuit 12 includes a so-called ring counter wherein an output signal is provided from one after another of the output terminals in response to each clock signal inputted thereto and is constructed to change over a shifting direction of the driving pulses in response to phases of two phase clock signals $\phi 1$ and $\phi 2$ from the microcomputer 14 to drive the stepping motor 3 to rotate in the forward or reverse direction.

The power source holding circuit 13 is constructed to supply an operating power source to the entire circuit from a cell 15 independently of the on or off position of the main switch S1 for a predetermined period of time from a point of time at which the main switch S1 which operates in response to a release button to a point of time at which the shutter mechanism completes its entire sequence of operations.

The microcomputer 14 is constructed such that it produces light emitting pulses, synchronous detection signals and two phase clock signals from reference clock signals from a crystal oscillator 14a and controls the operating times of the power source holding circuit 13, the active auto focusing circuit 10 and the light measuring circuit 11 in response to operation of the main switch S1 and the focusing - exposing mode changing over switch S2 while it reads out exposure data in response to light measuring signals to open or close the sector 5 with a number of steps corresponding to object brightness.

It is to be noted that reference numeral 16 in FIG. 4 denotes a distance indicating element which indicates a distance to an object determined from the coincidence signal from the active auto focusing circuit 10 and a motor driving two phase clock signal.

Figure 5:
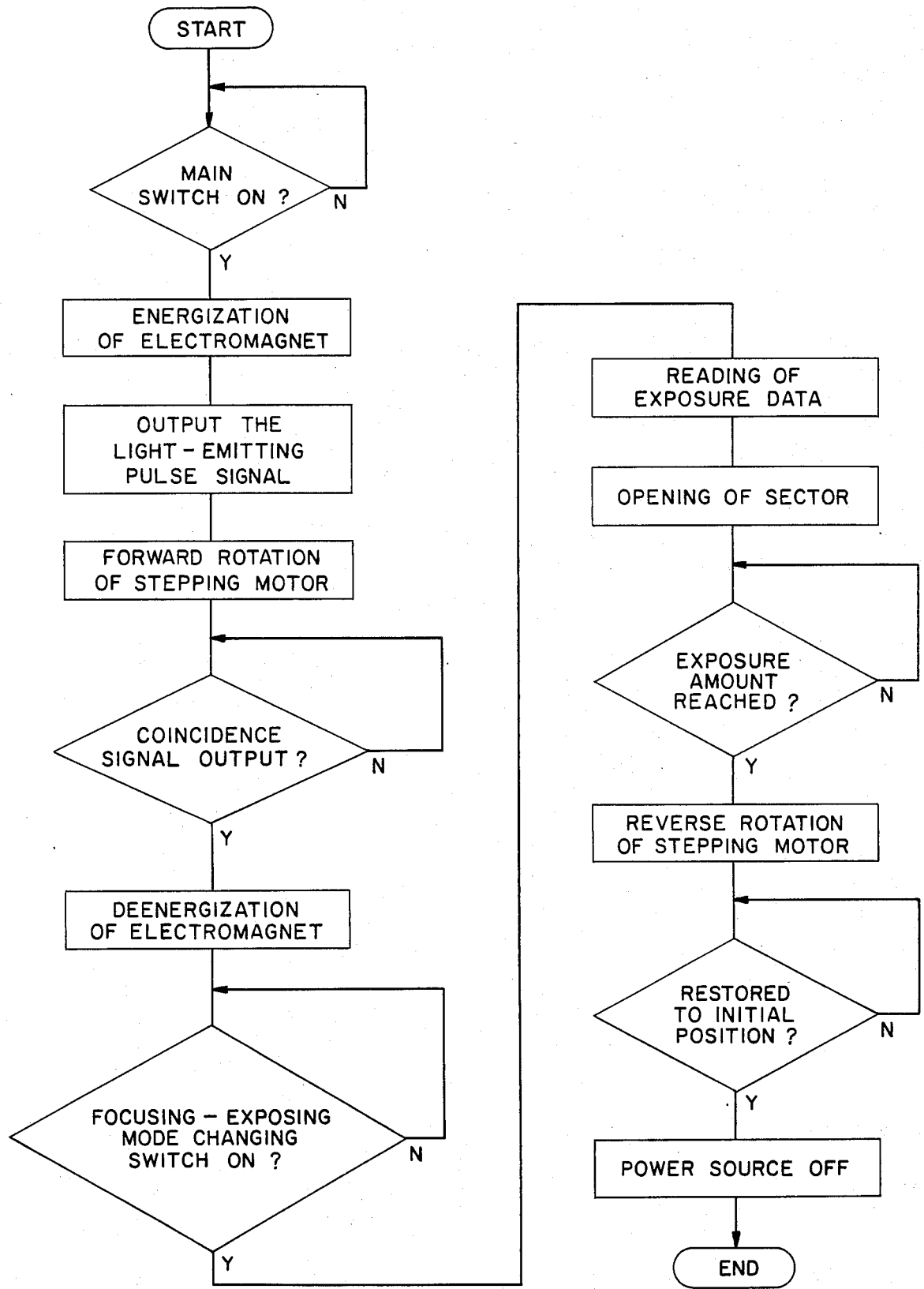
FIGS. 5 and 6 are a flow chart and a waveform diagram illustrating operations of the circuit of FIG. 4.
Figure 6:
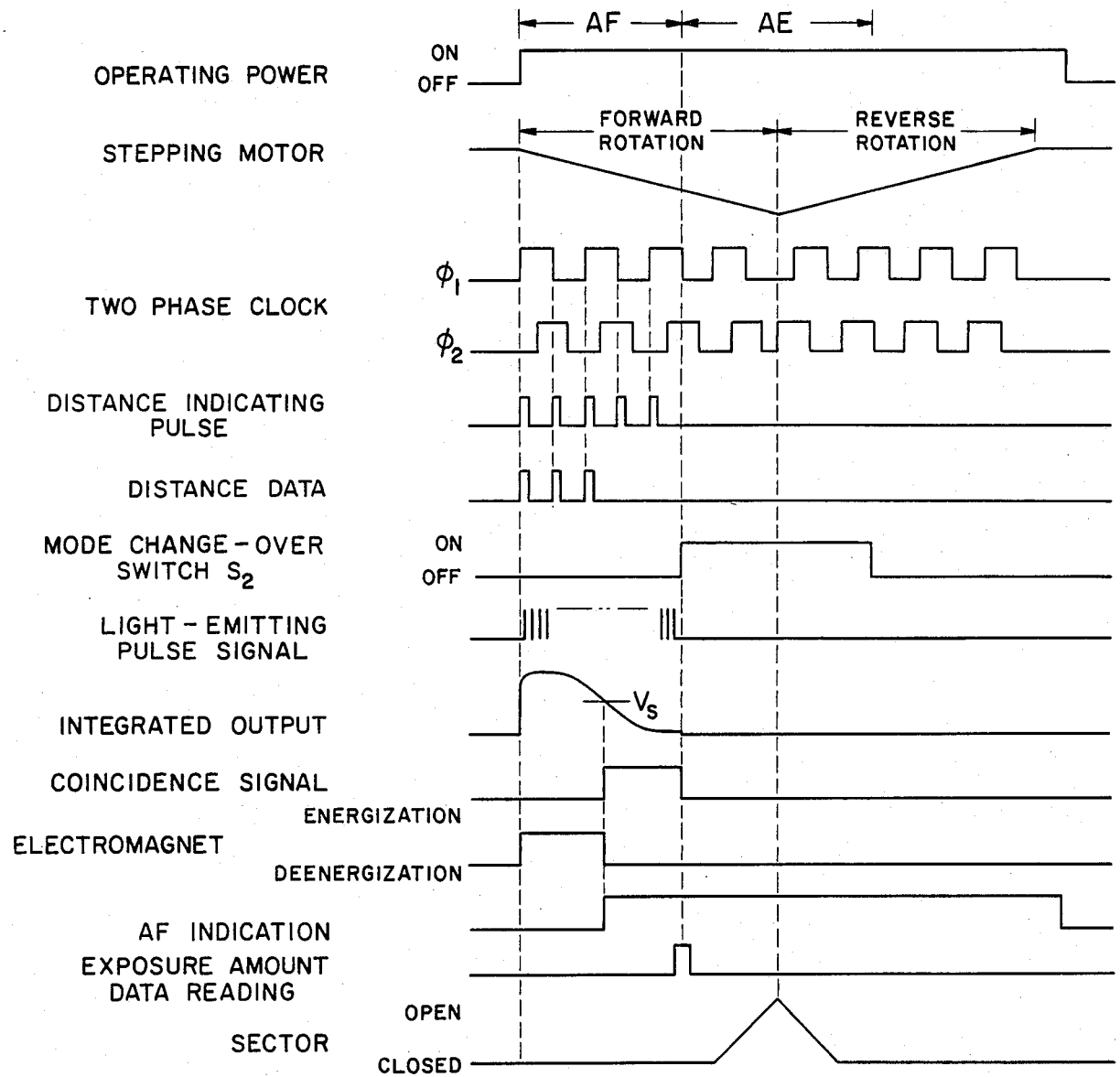

Now, operations of the arrangement having such a construction as described above will be described with reference to a flow chart shown in FIG. 5 and a waveform diagram shown in FIG. 6.

If a camera is directed toward an object to be photographed and a camera release button (not shown) is depressed, the main switch S1 is turned on so that the power source holding circuit 13 operates and thus operating power is supplied to the entire arrangement. As a result, the electromagnet 7e is energized. The microcomputer 14 outputs two phase clock signals to the motor driving circuit 12 to rotate the stepping motor 3 in the forward direction and simultaneously outputs light emitting pulses to the distance measuring circuit 10 to irradiate an infrared-ray beam toward the object. As the stepping motor 3 rotates in the forward direction, the light emitting element 6a scans in a direction of the optical axis while at the same time the two divided sensor 8 detects the reflected infrared-ray beam. The two phase clock signals are converted into distance indicating pulse signals to be counted.

If the focus of a taking lens (not shown) comes into coincidence with the distance to the object in this manner, the distance measuring circuit 10 outputs a coincidence of focusing signal to deenergize the electromagnet 7e so as to allow the interlocking plate 2 to be locked by the claw 7d and at the same time, the counting of distance indicating pulses is stopped and the result of count is converted into a distance so that the distance to the object is indicated on the distance indicating element 16.

Meanwhile, the stepping motor 3 continues the actuating plate 1 in the forward direction to turn the focusing - exposing mode changing over switch S2 on, while leaving the interlocking plate 2 as it is. As a result, the light measuring circuit 11 operates base an the object brightness and determines an exposure amount corresponding to the object brightness in accordance with an exposure amount data table stored therein. As the stepping motor 3 further continues its rotation in the forward direction, the shutter sector blades begins to be opened by the sector lever via the actuating plate 1, thereby beginning exposure. After the sector blades have been opened to a certain exposure amount in this manner, the microcomputer 14 reverses the phases of the two phase clock signals to reverse the stepping motor 3 in order to move the actuating plate 1 in the return direction to close the sector blades to complete the exposure. The stepping motor 3 further continues its rotation in the reverse direction so that the actuating plate 1 is engaged with and pushes back the interlocking plate 2 to to a predetermined position. At the same time, the power source holding circuit 13 is turned off to stop the supply of power to the entire arrangement, thereby completing a sequence of operations.

As apparent from the foregoing description, according to the present invention, focusing and exposure adjusting operations are actuated by a single electromagnetic actuating member. Accordingly, the entire mechanism can be simplified and handling of the mechanism can be made easier.

Besides, since a shutter of the invention is constructed such that an electromagnetic member is reversed to effect adjustment of exposure after lapse of a time corresponding to object brightness information by a controlling means which operates as a moving member moves into an exposure adjusting region, the stroke of the movable member can be reduced in response to object brightness to attain reduction of a power source for erasing magnetism and reduction of a time required for restoring the moving member.

What is claimed is:

1. An electromagnetically actuated shutter, comprising:
   a movable member mounted for movement in forward and reverse directions between a focusing region and an exposing operation region;
   a single electromagnetic actuating means for forwardly and reversely actuating said movable member;
   an interlocking member mounted to undergo movement with said movable member in said focusing region;
   a focus operating member actuated by forward movement of said interlocking member to effect an automatic focusing operation;
   a focusing control member engageable with said interlocking member to stop the forward movement thereof when said movable member moves through said focusing region and reaches a focusing point;
   shutter blades driven by a sector lever when said movable member undergoes movement in said exposing operation region; and controlling means operable in response to movement of said movable member into said exposing operation region for producing a reversing signal and applying the same to said electromagnetic actuating means after the lapse of a time corresponding to object brightness information to thereby cause said electromagnetic actuating means to move said movable member in the reverse direction.

2. In a camera shutter having a set of shutter blades sequentially movable in opening and closing directions to define an exposure interval: an actuating member mounted to sequentially undergo forward movement in a forward direction through a focusing region and an exposure region followed by return movement in a return direction through the exposure and focusing regions; means operative in response to forward movement of the actuating member in the focusing region to effect an automatic focusing operation; means operative in response to forward movement of the actuating member in the exposure region to effect opening movement of the set of shutter blades and operative in response to return movement of the actuating member in the exposure region to effect closing movement of the set of shutter blades; and electromagnetic driving means for sequentially driving the actuating member in the forward direction through the focusing and exposure regions and then in the return direction through the exposure and focusing regions.

3. A camera shutter according to claim 2; including control means operative in response to forward movement of the actuating member in the exposure region for producing an output signal after the lapse of a time interval corresponding to the brightness of an object being photographed; and wherein the electromagnetic driving means includes means responsive to the output signal for commencing driving of the actuating member in the return direction.

4. A camera shutter according to claim 3, wherein the electromagnetic driving means comprises a stepping motor rotatable in forward and reverse directions of rotation, and means responsive to the forward and reverse rotations of the stepping motor for accordingly driving the actuating member in the forward and return directions.

5. A camera shutter according to claim 2; wherein the actuating member comprises a linearly displaceable member.

6. A camera shutter according to claim 2; wherein the means to effect an automatic focusing operation comprises an interlocking member mounted to undergo forward and return movements together with the actuating member in the focusing region, and means releasably engageable with the interlocking member to arrest the forward movement thereof at the completion of the automatic focusing operation while permitting the actuating member to continue its forward movement.

7. A camera shutter according to claim 6; including control means operative in response to forward movement of the actuating member in the exposure region for producing an output signal after the lapse of a time interval corresponding to the brightness of an object being photographed; and wherein the electromagnetic driving means includes means response to the output signal for commencing driving of the actuating member in the return direction.

8. A camera shutter according to claim 2, wherein the actuating member comprises an angularly displaceable member.

9. In a camera shutter having automatic focusing means operative when actuated to effect an automatic focusing operation, and automatic exposure means including a set of shutter blades operative when sequentially actuated in opening and closing directions to effect an automatic exposure operation: actuating means displaceable in a forward direction to sequentially actuate the automatic focusing means and thereafter actuate the shutter blades in the opening direction and then displaceable in a return direction to actuate the shutter blades in the closing direction; and electromagnetic driving means for sequentially displacing the actuating means in the forward and return directions.

10. A camera shutter according to claim 9; wherein the electromagnetic driving means comprises a stepping motor rotatable in forward and reverse directions of rotation, and means responsive to the forward and reverse rotations of the stepping motor for accordingly displacing the actuating means in the forward and return directions.

11. A camera shutter according to claim 10; wherein the actuating means comprises linearly displaceable actuating means mounted to undergo linear displacement in the forward and return directions.

12. A camera shutter according to claim 11; including an interlocking member mounted to undergo forward and return displacements together with the actuating means, and means releasably engageable with the interlocking member to arrest the forward displacement thereof at the completion of the automatic focusing operation while permitting the actuating means to continue its forward displacement.

13. A camera shutter according to claim 10; wherein the actuating means comprises angularly displaceable actuating means mounted to undergo angular displacement in the forward and return directions.

14. A camera shutter according to claim 13; including an interlocking member mounted to undergo forward and return displacements together with the actuating means, and means releasably engageable with the interlocking member to arrest the forward displacement thereof at the completion of the automatic focusing operation while permitting the actuating means to continue its forward displacement.

15. A camera shutter according to claim 9; wherein the actuating means comprises linearly displaceable actuating means mounted to undergo linear displacement in the forward and return directions.

16. A camera shutter according to claim 15; including an interlocking member mounted to undergo forward and return displacements together with the actuating means, and means releasably engageable with the interlocking member to arrest the forward displacement thereof at the completion of the automatic focusing operation while permitting the actuating means to continue its forward displacement.

17. A camera shutter according to claim 9; wherein the actuating means comprises angularly displaceable actuating means mounted to undergo angular displacement in the forward and return directions.

18. A camera shutter according to claim 17; including an interlocking member mounted to undergo forward and return displacements together with the actuating means, and means releasably engageable with the interlocking member to arrest the forward displacement thereof at the completion of the automatic focusing operation while permitting the actuating means to continue its forward displacement.

* * * * *